United States Patent
Jenkins

(10) Patent No.: US 10,884,105 B2
(45) Date of Patent: Jan. 5, 2021

(54) OPTICAL SYSTEM INCLUDING AN OPTICAL BODY WITH WAVEGUIDES ALIGNED ALONG AN IMAGINARY CURVED SURFACE FOR ENHANCED BEAM STEERING AND RELATED METHODS

(71) Applicant: EAGLE TECHNOLOGY, LLC, Melbourne, FL (US)

(72) Inventor: Micah H. Jenkins, Palm Bay, FL (US)

(73) Assignee: EAGLE TECHNOLOGY, LLC, Melbourne, FL (US)

(*) Notice: Subject to any disclaimer, the term of this patent is extended or adjusted under 35 U.S.C. 154(b) by 345 days.

(21) Appl. No.: 15/993,847

(22) Filed: May 31, 2018

(65) Prior Publication Data

US 2019/0369213 A1 Dec. 5, 2019

(51) Int. Cl.
| | |
|---|---|
| G01S 7/00 | (2006.01) |
| G01S 7/481 | (2006.01) |
| G01S 17/89 | (2020.01) |
| G02B 3/00 | (2006.01) |
| G01S 17/931 | (2020.01) |

(52) U.S. Cl.
CPC ............ *G01S 7/4811* (2013.01); *G01S 17/89* (2013.01); *G01S 17/931* (2020.01); *G02B 3/0006* (2013.01)

(58) Field of Classification Search
USPC ....................................................... 356/4.01
See application file for complete search history.

(56) References Cited

U.S. PATENT DOCUMENTS

| | | | |
|---|---|---|---|
| 6,829,439 B1 | 12/2004 | Sidorovich et al. | |
| 7,095,931 B2* | 8/2006 | Sezerman | C03C 23/0025 385/123 |
| 7,294,454 B1* | 11/2007 | Said | G02B 6/13 219/121.19 |
| 7,295,731 B2* | 11/2007 | Sezerman | C03C 23/0025 385/123 |
| 8,836,922 B1 | 9/2014 | Pennecot et al. | |
| 9,488,778 B2* | 11/2016 | Osellame | G02B 6/126 |
| 9,810,775 B1 | 11/2017 | Welford et al. | |
| 10,365,536 B1* | 7/2019 | Jenkins | G02F 1/2955 |
| 2004/0094527 A1* | 5/2004 | Bourne | G02B 6/132 219/121.85 |

(Continued)

FOREIGN PATENT DOCUMENTS

| | | |
|---|---|---|
| WO | WO2012153309 | 11/2012 |
| WO | WO2017132704 | 8/2017 |

OTHER PUBLICATIONS

European Search Opinion for Application 19174423 (Year: 2019).*

(Continued)

*Primary Examiner* — James R Hulka
(74) *Attorney, Agent, or Firm* — Allen, Dyer, Doppelt + Gilchrist, P.A.

(57) ABSTRACT

An optical system is provided which may include an optical body, and a plurality of optical devices carried by the optical body. Furthermore, a plurality of optical waveguides may extend within the optical body between respective optical devices and an imaginary curved surface within the optical body, and an optical element may be coupled to the optical body and be optically aligned with the plurality of optical waveguides. A controller may be configured to selectively operate the plurality of optical devices to generate at least one optical beam.

28 Claims, 10 Drawing Sheets

(56) References Cited

U.S. PATENT DOCUMENTS

| | | | |
|---|---|---|---|
| 2005/0052751 A1 | 3/2005 | Liu et al. | |
| 2006/0008238 A1 | 1/2006 | Suzuki et al. | |
| 2007/0086702 A1 | 4/2007 | Peters et al. | |
| 2009/0310912 A1 | 12/2009 | Bidnyk et al. | |
| 2013/0234009 A1 | 9/2013 | Guldimann | |
| 2013/0278713 A1 | 10/2013 | Banks | |
| 2013/0314711 A1 | 11/2013 | Cantin et al. | |
| 2015/0192677 A1 | 7/2015 | Yu et al. | |
| 2015/0293224 A1* | 10/2015 | Eldada | G01S 17/89 250/206.1 |
| 2015/0312554 A1 | 10/2015 | Banks et al. | |
| 2015/0377453 A1 | 12/2015 | Ji et al. | |
| 2015/0378241 A1* | 12/2015 | Eldada | G01S 7/4817 359/15 |
| 2016/0047901 A1 | 2/2016 | Pacala et al. | |
| 2016/0049765 A1 | 2/2016 | Eldada | |
| 2016/0054522 A1* | 2/2016 | Osellame | G02B 6/126 65/392 |
| 2016/0161600 A1 | 6/2016 | Eldada et al. | |
| 2017/0146640 A1 | 5/2017 | Hall et al. | |
| 2017/0269198 A1 | 9/2017 | Hall et al. | |
| 2017/0299700 A1 | 10/2017 | Pacala et al. | |
| 2017/0356740 A1 | 12/2017 | Ansari et al. | |
| 2017/0371227 A1 | 12/2017 | Skirlo et al. | |
| 2019/0243210 A1* | 8/2019 | Jenkins | G01S 17/02 |

OTHER PUBLICATIONS

U.S. Appl. No. 15/890,605, filed Feb. 7, 2018.
Kramer et al. "Beam steering for handheld and portable devices has fingertip size, battery power, milliradian precision, mobile-phone robustness, and fully integrated microelectronics" Jul. 10, 2015 https://www.laserfocusworld.com/articles/print/volume-51/issue-07/feature/micro-beam-steering-precision-micro-beam-steering-systems-simplify-move-to-handheld-instruments.html pp. 8.
Sun et al. "Large-scale silicon photonic circuits for optical phased arrays" IEEE Journal of Selected Topics in Quantum Electronics • Jul. 2014. pp. 15.

* cited by examiner

OPTICAL SYSTEM INCLUDING AN OPTICAL BODY WITH WAVEGUIDES ALIGNED ALONG AN IMAGINARY CURVED SURFACE FOR ENHANCED BEAM STEERING AND RELATED METHODS

TECHNICAL FIELD

The present invention relates to sensing and communications systems, and more particularly, to optical devices for sensing and communication applications and related methods.

BACKGROUND

High-speed miniaturized wide-angle low divergence laser beam steering actuators are used for various applications, such as LIDAR sensors. The traditional approach of mechanically rotating a mirror or lens, though capable of meeting certain angular range and beam divergence requirements, is tightly constrained in terms of size, drive power, and speed due to the required mechanical actuation of a large aperture.

One mechanical beam steering approach currently in use includes a rotating (azimuth) lens with a linear array of emitters in the back focal plane. However, when used in applications where size, weight, and power (SWaP) requirements are demanding, such as unmanned aerial vehicles (UAVs), certain compromises may be required in beam steering ability to meet the SWaP restrictions. Still another class of piezo motor-driven micro-mechanical sensors has been used in some applications as well, but such sensors are also generally limited in angular resolution and speed to millisecond timeframes.

To enable high-speed steering over a large aperture on a single monolith, some attempts have been made at developing optical phased array technology. However, it has proven difficult to realize a wide steering range (>~±10 degrees) because of the relatively close spacing of optical emitters that is required.

One electronic beam steering approach is to switch between a large number of optical emitters in the focal plane of a lens or mirror. This approach, however, typically suffers from a limited field of view due to the large number of sizable optics required to form a planar focal surface. Still other electronic beam steering approaches involve monolithic integration of optical phased array technology. Yet, the relatively small size of current state-of-the-art arrays limits the available resolution and steering range of such devices, and may introduce multiple side-lobes.

U.S. Pat. Pub. No. 2013/0234009 to Guldimann discloses optical devices for imaging and spectroscopic applications where optical field curvature is a predominant characteristic. In particular, the disclosure relates to imaging optics and an optical device for mapping a curved image field. The optical device for mapping a curved image field includes a focal plane array having a plurality of light processing elements and a focal plane adapter mounted in front of the focal plane array that is configured to transmit the curved image field to the light processing elements of the focal plane array. The focal plane adapter includes a plurality of waveguides. First ends of the waveguides facing the incident curved image field are arranged on a curved surface, with the curved surface being adapted to a profile of an optical field curvature of the curved image field so that the plurality of waveguides divide the curved image field along a curved focal plane of the image field into a plurality of image segments. The second ends of the waveguides are allocated to the light processing elements to map the plurality of image segments onto the allocated light processing elements.

Despite the existence of such systems, further developments in optical devices to provide improved beam steering capabilities may be desirable in certain applications.

SUMMARY

An optical system is provided which may include an optical body, and a plurality of optical devices carried by the optical body. Furthermore, a plurality of optical waveguides may extend within the optical body between respective optical devices and an imaginary curved surface within the optical body, and an optical element may be coupled to the optical body and be optically aligned with the plurality of optical waveguides. A controller may be configured to selectively operate the plurality of optical devices to generate at least one optical beam.

More particularly, the imaginary curved surface may be concave, and the optical element may comprise at least a portion of a spherical lens (e.g., ball lens, half ball lens, etc.). In accordance with an example implementation, the optical system may further include a phase modulator carried by the optical body and associated with the plurality of optical waveguides. More specifically, the phase modulator may include at least one phase shifter associated with a respective optical waveguide. A controller may also be coupled to the phase modulator. In accordance with still another example, at least one amplitude control element may be associated with a respective optical waveguide.

By way of example, the plurality of optical devices may include vertical-cavity, surface-emitting lasers (VCSELs), photodiodes, etc. In another example implementation, the optical body may comprise a monolithic silica body.

A related method for making the optical system is also provided.

DETAILED DESCRIPTION OF THE EMBODIMENTS

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime notation and multiple prime notation are used to indicate similar elements in different embodiments.

Figure 1:
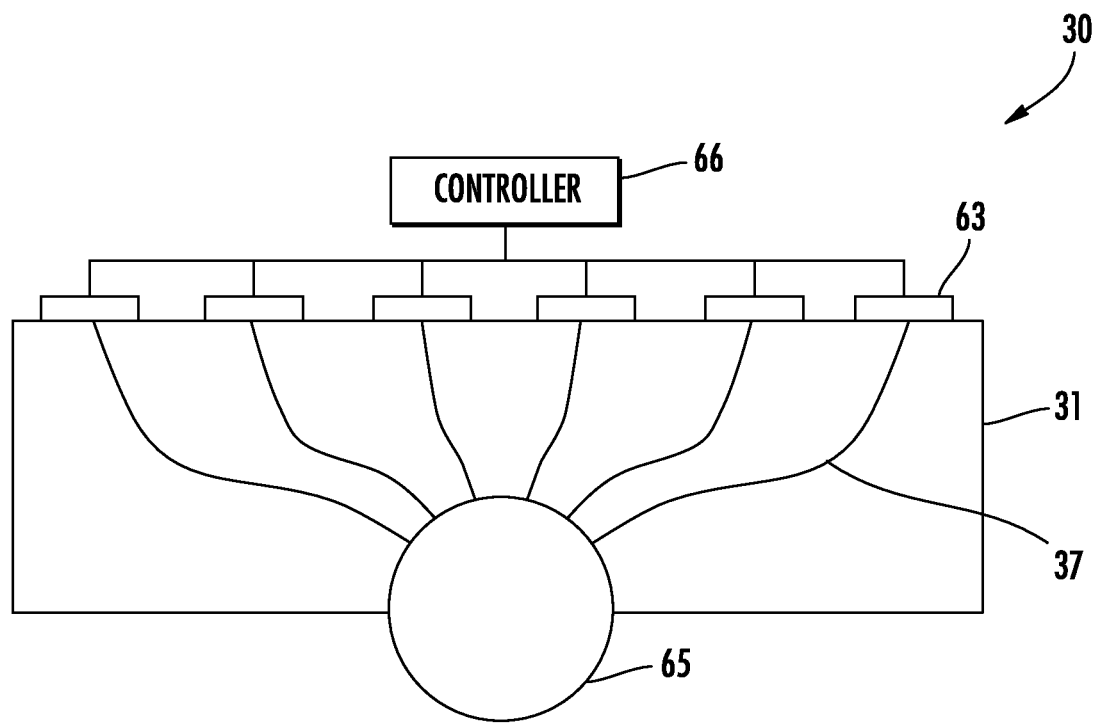
FIG. 1 is a schematic block diagram of an optical system in accordance with an example embodiment including an optical body having a curved surface.
Figure 2:
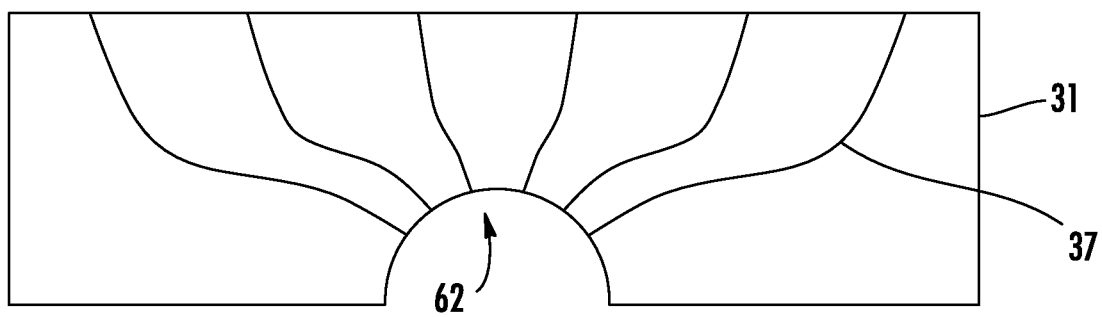
FIG. 2 is a schematic block diagram of the monolithic optical body of FIG. 1.
Figure 3:
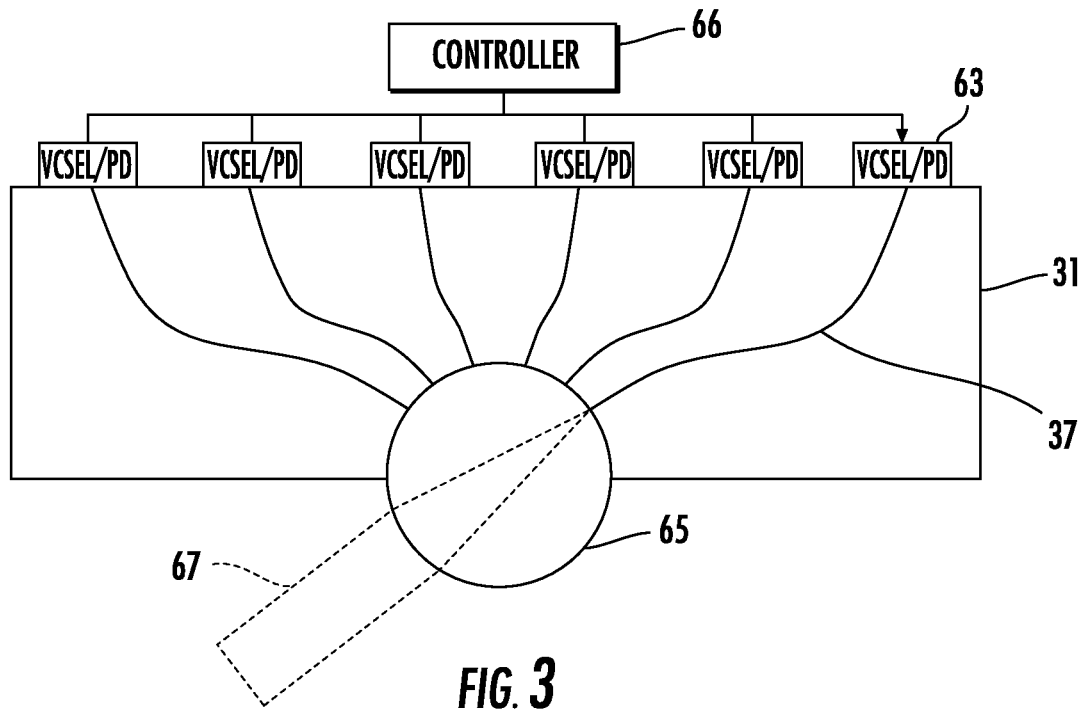
FIGS. 3 and 4 are schematic block diagrams of the optical system of FIG. 1 illustrating optical beam steering over an extended beam angle range.

Referring initially to FIGS. 1-3, an optical system 30 illustratively includes an optical body 31 having a curved surface 62, and a plurality of optical devices 63 carried by the optical body and spaced from the curved surface. Furthermore, a plurality of optical waveguides 37 extend within the optical body 31 between respective optical devices 63 and the curved surface 62, and an optical element 65 is coupled to the curved surface. By way of example, the optical devices 63 may be vertical-cavity, surface-emitting lasers (VCSELs), photodiodes (PDs), etc.

In an example implementation, the optical body 31 may be a monolithic silica body. More particularly, the optical material may be fused silica, although other suitable optical materials may be used in different embodiments. In accordance with one example implementation, the monolithic body 31 and waveguides 37 therein may be formed using a femtosecond laser, and more particularly femtosecond laser direct writing (FLDW) and/or femtosecond laser induced chemical etching (FLICE).

The optical system 30 accordingly provides a curved array of optical emitters, which provides several advantages. These include relatively high switching speed, as the optical system 30 utilizes electronic switching of the optical devices 63 to perform beam steering. In the illustrated example, a controller or control circuitry 66 is coupled to the optical devices 63 to selectively control these devices for optical signal transmission/reception, as will be discussed further below. The controller 66 may be implemented using a microprocessor, application specific integrated circuit (ASIC), field-programmable gate array (FPGA), etc., which may be mounted on the optical body 31 in some embodiments (although it may also be located separate from the optical body as well). It should be noted that although the present example is described with reference to electronic switching, in other embodiments optical switching the output of a single laser source may be performed, in which the optical switches may be solid-state, mechanical, MEMS-based, etc. The optical switch network may include components external to the device, which in the embodiment of FIG. 1 would be fed by an array of fibers (e.g., an MPO fiber ribbon connector), or the switch network may be integrated onto the monolithic body 31.

Another advantage of the optical system 30 is its relatively small size. That is, the example configuration utilizes a single lens design with monolithic integration of the array of waveguides 37 and high-speed optical devices/switches 63. By way of example, the lens 65 may be attached to the optical body 65 using an optical adhesive, as will be appreciated by those skilled in the art.

Generally speaking, the size of the lens 65 sets the beam divergence, which may be relatively low (~0.05 degree for 1 cm diameter lens and 0.2 NA waveguides). Furthermore, angular resolution may also be set by the size of the ball lens and NA of the waveguides. By way of example, for a 1 cm lens and 0.2 NA waveguides, the angular resolution may be approximately 0.15 degrees. Generally speaking, the angular resolution is set by the size of the ball lens, in that a larger sizer results in more angular resolution/low beam divergence, and conversely a smaller size results in less resolution/higher beam divergence.

Still another advantage of the optical system 30 is that is provides a relatively wide angular range for beam steering with relatively low beam divergence, which in the present example is based upon aperture size and beam quality. This is better than a traditional phased array approach because of the continuous phase ramp applied by the lens 65, as will be appreciated by those skilled in the art. In accordance with an example implementation, the beam steering range may be ±70°, or more. Generally speaking, the more optical devices 63 and waveguides 37 that are used along the curved surface 65, the closer the beam steering range will come to full 180° coverage.

Figure 4:
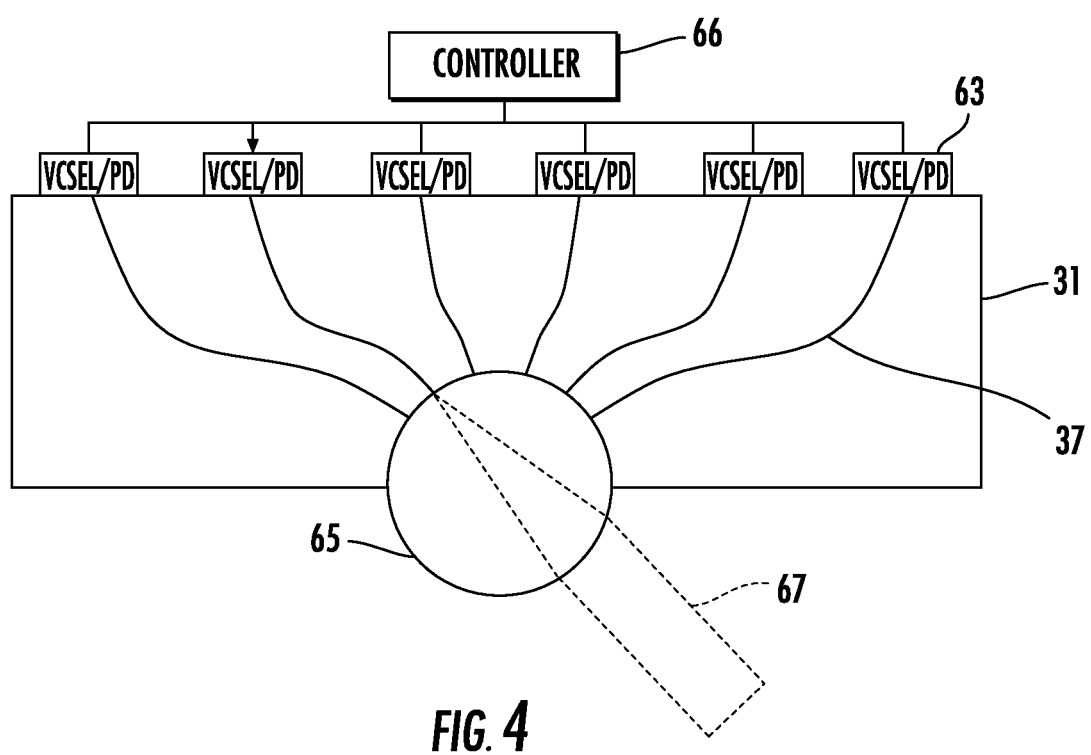

Beam steering is schematically shown in FIGS. 3 and 4. In a first instance (FIG. 3), the optical device 63 at the far right of the array is actuated (as indicated by the arrow), resulting in a beam 67 directed to the left. At a second time (FIG. 3), the optical device 63 second from the left in the array is actuated (again indicated by the arrow), resulting in the beam 67 being directed in a different direction (here to the right). It will be appreciated that this is a simple 2D example involving action of a single optical device 63 at a time to demonstrate how the beam 67 is steered. However, with a 3D array of waveguides 37 terminating at multiple points along the hemisphere defined by the curved surface 62, it will be appreciated that one or more of the optical devices 63 may be selectively actuated at a given time to provide different beam widths and steering angles over substantially a full 180° range, as noted above.

Figure 5:
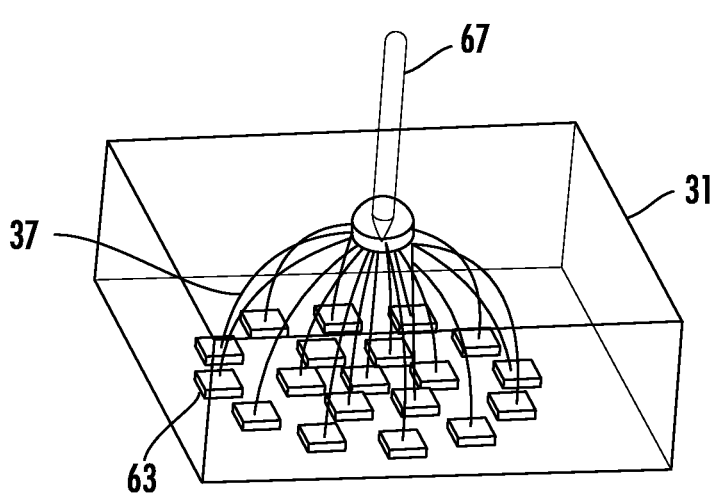
FIGS. 5-7 are perspective views of an example implementation of the optical system of FIG. 1 with a 3D waveguide array illustrating optical beam steering over an extended beam steering range.
Figure 6:
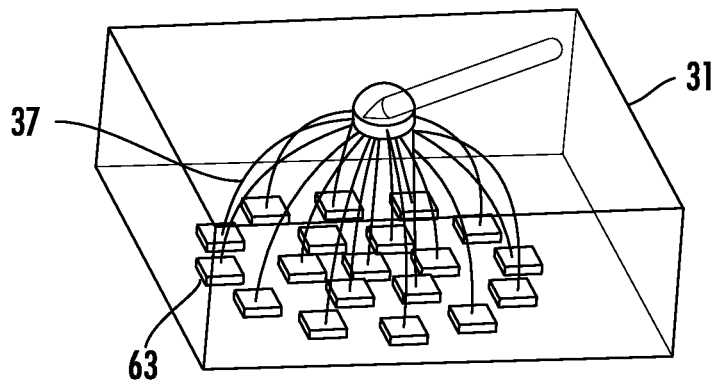
Figure 7:
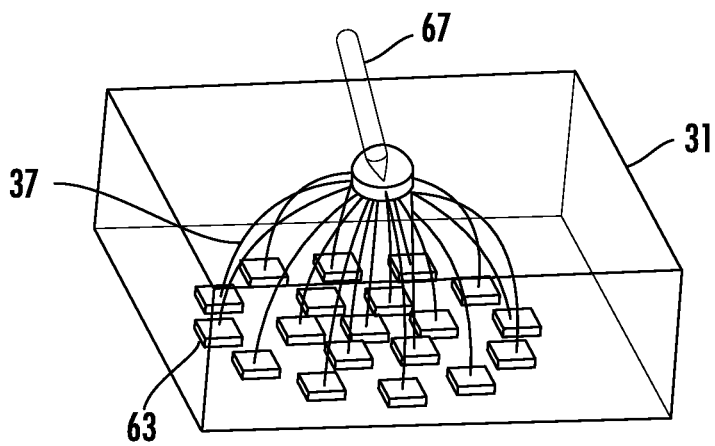

A simplified 3D configuration of waveguides 37 is shown in FIGS. 5-7, where a single beam 67 is again steered in different directions based upon selective actuation of different optical devices 63. In the case where VCSELs are used for the optical devices 63, the waveguides 37 may intersect with a polished or mirrored surface defined within the optical body 31 (e.g., a 45° flat polished surface) to direct light from the VCSEL die to the appropriate termination point on the curved surface 62, as will be appreciated by those skilled in the art. In one example process, FLICE etched grind stops may be used to define the mirrored surface, for example.

Figure 8:
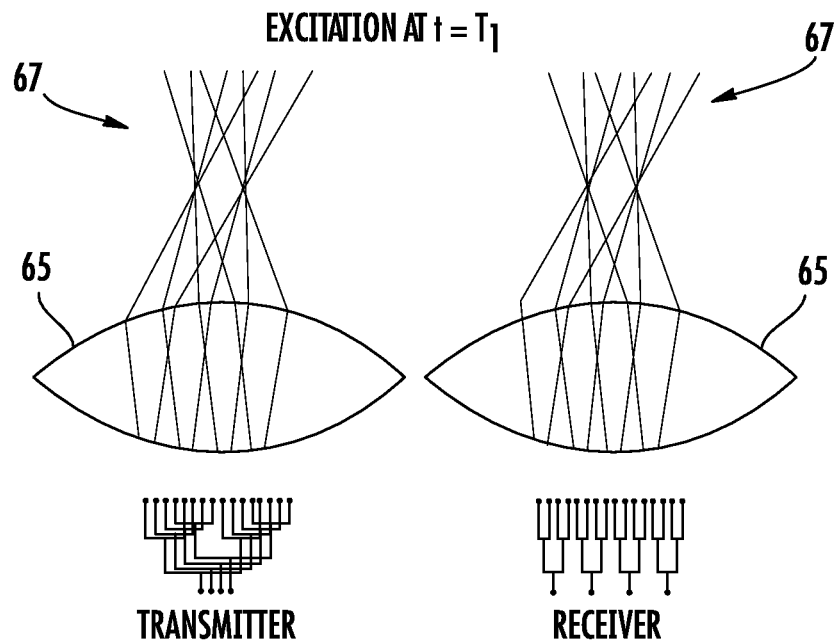
FIGS. 8 and 9 are schematic diagrams illustrating an example transmitter/receiver configuration for use with the optical system of FIG. 1 at different times to provide phased array operation.
Figure 9:
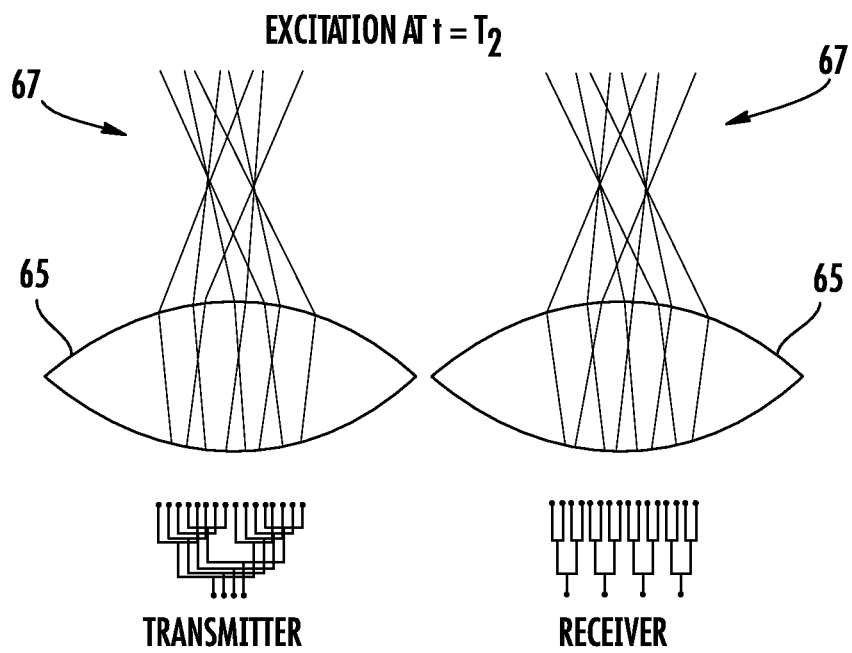

Sequential actuation of optical devices 63 in parallel to transmit and receive light from multiple different waveguides 37 is illustrated in FIGS. 8 and 9. At a first time $T_1$ (FIG. 10), selective optical devices 63 are actuated to select a plurality of beams 67 which are directed slightly to the right in the illustrated example. At a second time $T_2$ (FIG.

11), a different set of optical devices 63 are actuated by the controller 66 such that the plurality of beams 67 are directed slightly to the left in the illustrated example. However, it should be noted that in some embodiments all (or substantially all) of the optical devices 63 may be simultaneously actuated to provide a FLASH LIDAR configuration for imaging an entire scene at the same time (as opposed to sequentially sweeping a narrower beam(s) over it). In such embodiments, the optical transmissions and returns may be separately routed to respective transmit/receive devices, for example. It will be appreciated that a device user may control the resolution and frame rate of the LiDAR sensor in real-time by programming the controller accordingly.

Generally speaking, the scan speed of the optical system 30 is based upon two factors. The first is the speed of the optical devices 63 driving the waveguide array. The second factor is the degree of beam parallelization used. That is, multiple waveguides 37 may be excited simultaneously with more laser power and parallel detection circuits, such as in the above-noted case of a FLASH LIDAR. In one example configuration, high-speed 1×Ns optical switches (where $N_s=N/N_D$ and N is the total waveguide count and $N_D$ is the number of detection circuits) may be used.

Figure 10:
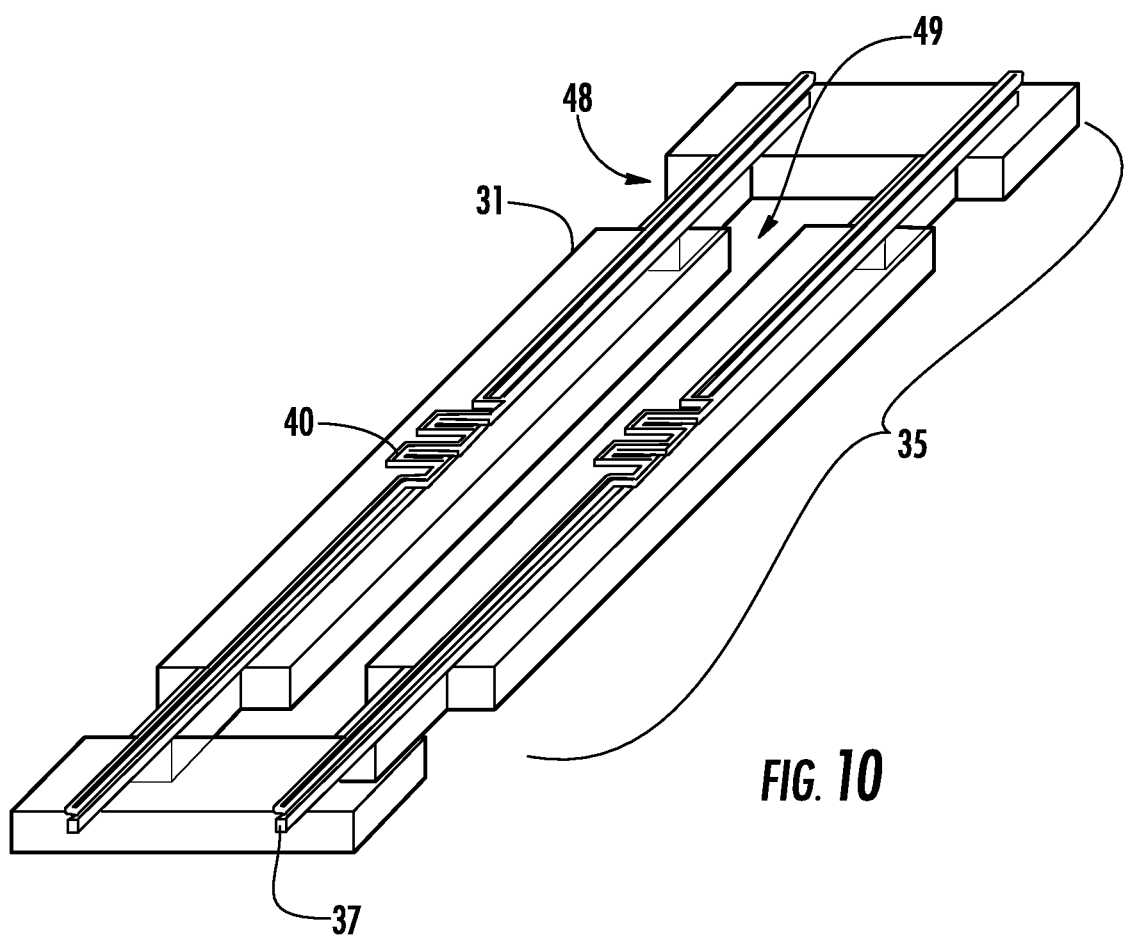
FIG. 10 is a perspective view of an example micro-heater phase shifter configuration which may be used in a modulation portion of the optical system of FIG. 1.
Figure 11:
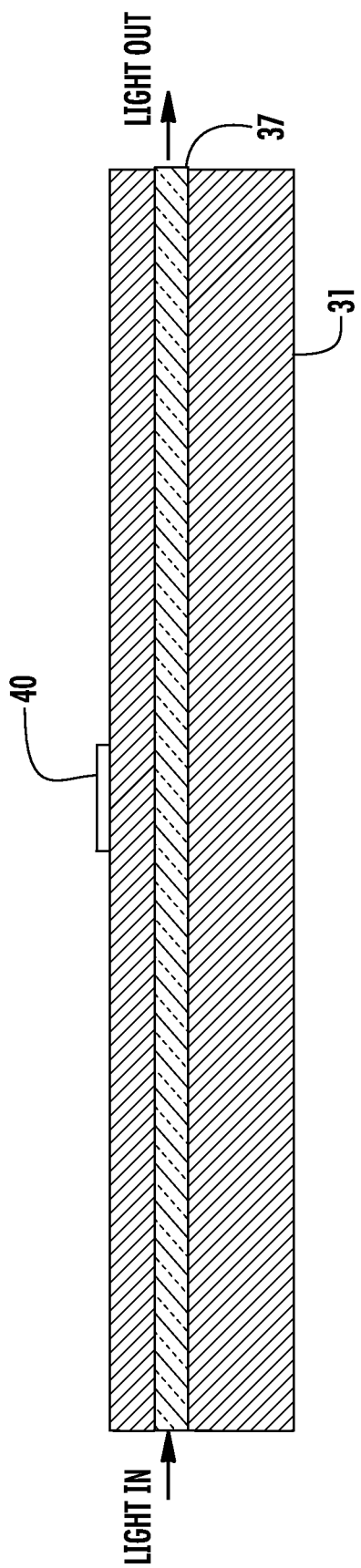
FIG. 11 is a side view of a micro-heater element of FIG. 10.

Referring additionally to FIGS. 10 and 11, in some example implementations it may be desirable to further include phase and/or amplitude modulation functionality. One application where integrated phase and/or amplitude modulators may be included is the case of a low size, weight, and power coherent optical communications beam steering transmitter. For example, with multiple modulators, multiple coherently modulated beams may be transmitted in different directions simultaneously. In the illustrated examples, the optical system 30 further includes a modulation portion 35, which in the present example includes a plurality of phase shifters carried by the optical body and associated with the plurality of optical waveguides. In the present example, the phase shifters may take the form of micro-heater elements 40 which in the illustrated configuration overlie respective waveguides 37. The embodiment illustrated in FIG. 10 is a suspended micro-heater array configuration, in which spaces or recesses 48, 49 are respectively etched below and between each of the waveguides 37 (and, accordingly, between the micro-heater elements 40 as well). This advantageously helps provide thermal insulation between the waveguides 37 to allow for more precise control of the waveguide temperatures and, accordingly, the respective phases of light traveling through each of these waveguides. In one example configuration, the resistive micro-heater elements 40 may heat the respective waveguides 37 up to approximately 80° C. by dissipating ~200 μW in each resistor, which produces Δθ=4Π.

By way of example, the resistive micro-heater elements 40 may be patterned directly onto the fused silica monolithic body 31, as will be discussed further below. The relative phase delay through the waveguide 37 is proportional to $$\theta \propto \frac{2\pi}{\lambda} dndT \int_0^L \Delta T(z)dz,$$

where $\Delta T(z)$ is the thermal rise profile along the waveguide resulting from a resistive micro heater.

Figure 12:
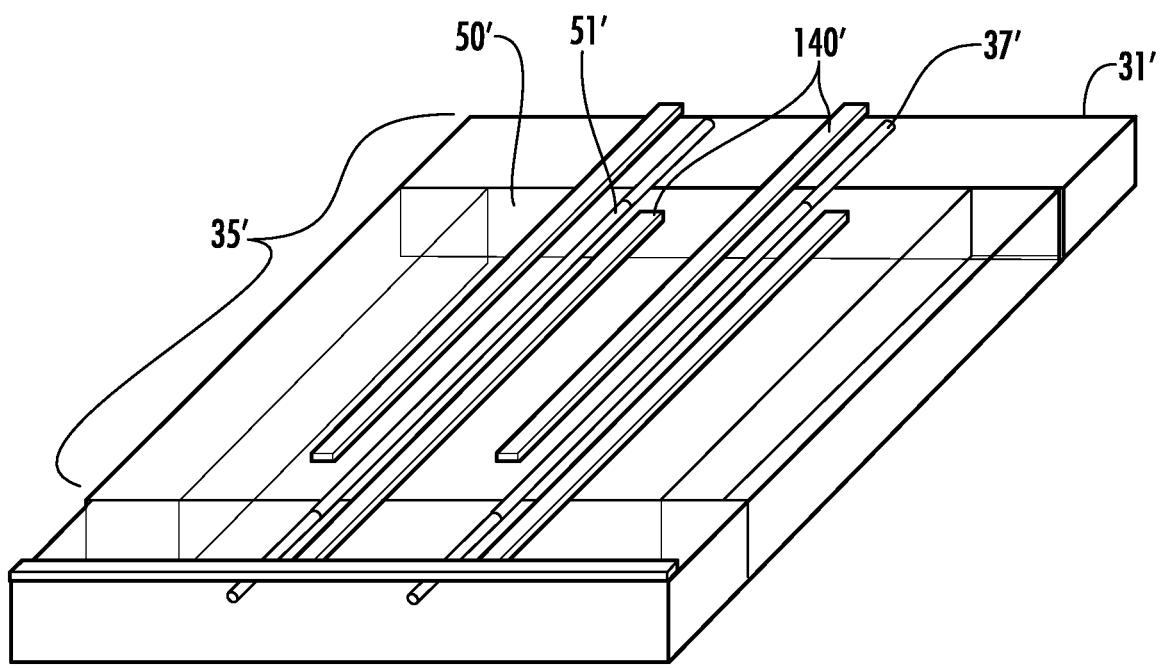
FIGS. 12 and 13 are perspective views of an example integrated Lithium Niobate phase modulator configuration which may be used in a modulation portion of the optical system of FIG. 1.

In accordance with another example embodiment now described with reference to FIGS. 12 and 13, the phase shifters may also be implemented using electrodes 140' patterned on an integrated electro-optic material, such as Lithium Niobate (LiNbO$_3$) 50. In the illustrated example, a respective pair of electrodes 140' is positioned adjacent each waveguide 37' within the phase modulation portion 35' of the body 31', with the waveguide being positioned between or in the middle of its respective pair of electrodes. It should be noted that in other embodiments, different electro-optic materials may be used, if desired. The illustrated example of FIG. 13 demonstrates how an electric field (represented by lines 41') created by the electrodes 140' passes through the respective waveguide 37' to alter the phase of light passing therethrough. In one example embodiment, the waveguide in the electro-optic material 50' may be fabricated via ion-beam implantation prior to integration within monolithic body 31'. The recess in the monolithic body 31' may be defined via femtosecond laser processing prior to inserting the electro-optic material 50' and patterning the electrodes 140', for example.

In accordance with one example implementation, the LiNbO$_3$ material 50' and embedded waveguides 51' may be fabricated separately and integrated into the fused silica body 31' via defined sockets created during patterning of the optical device, such as with a femtosecond laser process. In the illustrated example, the relative phase delay through the embedded waveguide 51' is proportional to $$\theta \propto \frac{2\pi}{\lambda} r \int_0^L E(z)dz,$$

where E(z) is the electric field profile along the embedded waveguide 51' resulting from the electrodes 140' and r is relevant electro-optic coefficient. In the present example, an optional insulating buffer layer 42' (e.g., SiO$_2$) is provided between the body 31' and the electrodes 140'.

Figure 14:
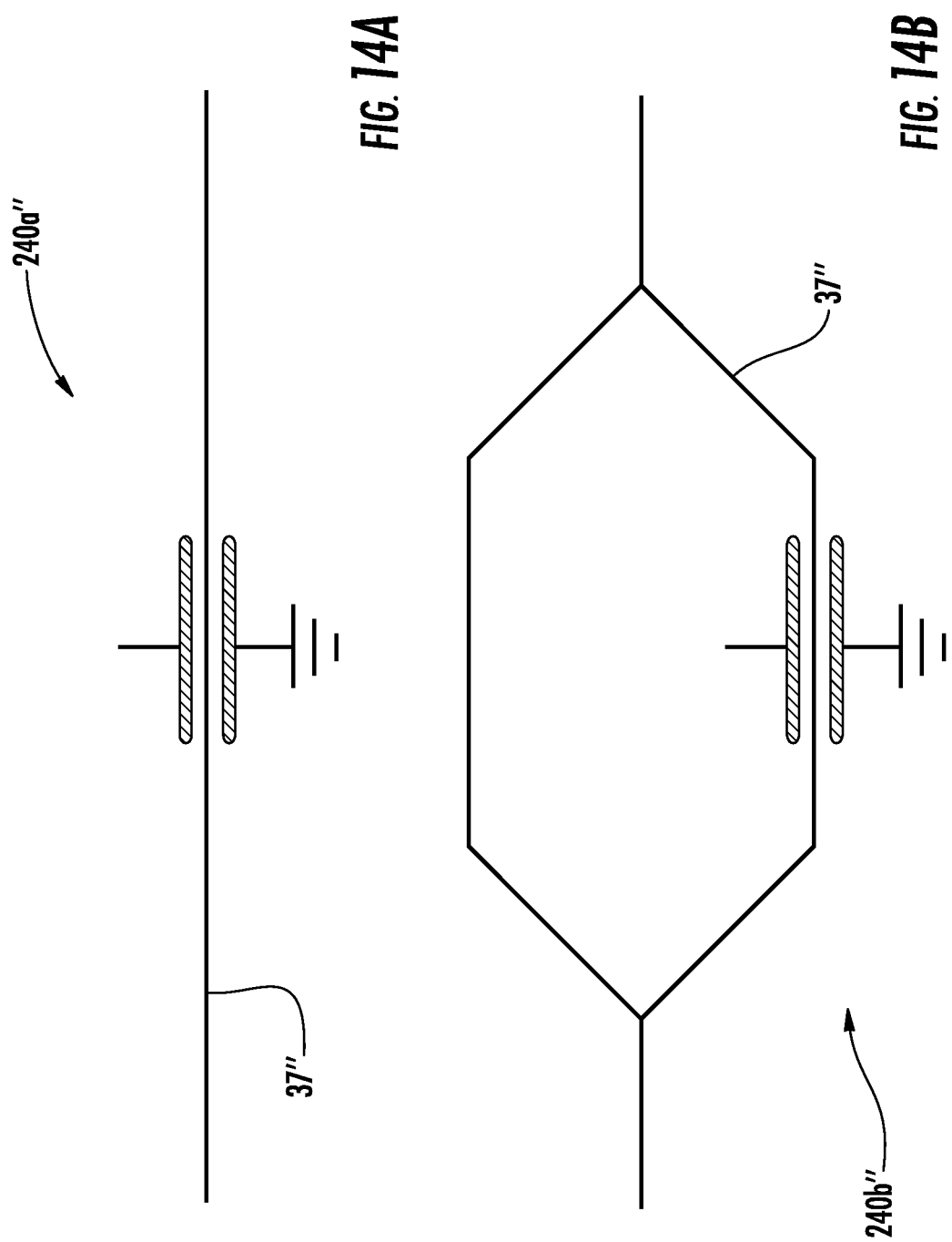
FIGS. 14a and 14b are equivalent schematic circuit diagrams of a phase shifter and a Mach-Zehnder modulator (MZM) amplitude control configuration which may be used in the optical system of FIG. 1.
Figure 15:
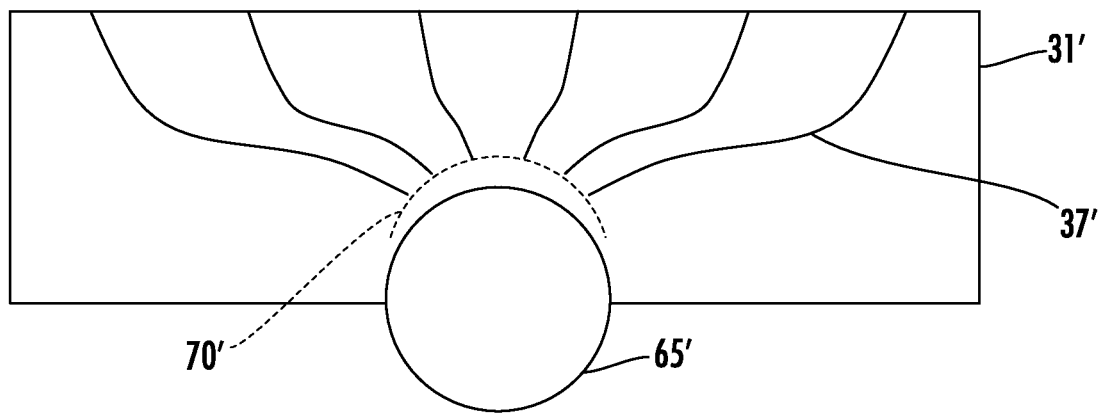
FIG. 15 is a schematic block diagram of an alternative embodiment of the monolithic optical body of FIG. 2 in which an imaginary curved surface where the waveguides terminate is spaced apart from a curved surface of the optical body in which the optical lens is seated.
Figure 16:
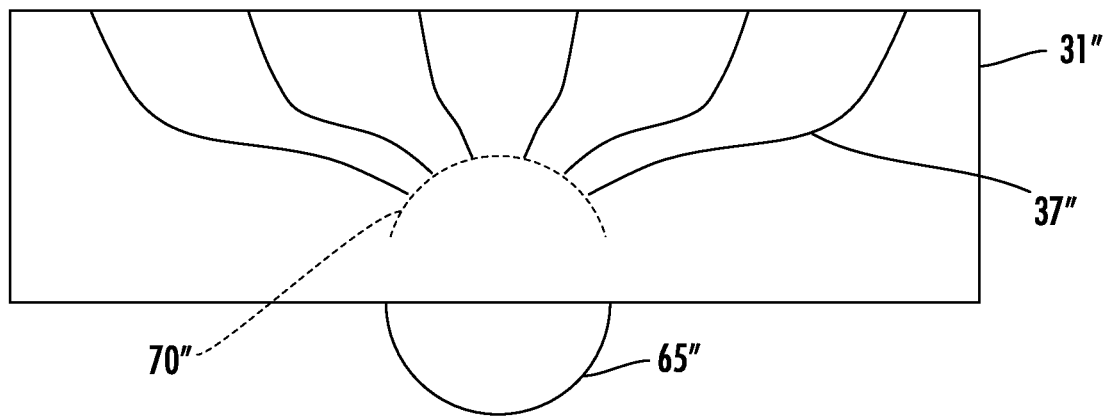
FIG. 16 is a schematic block diagram of another alternative embodiment of the monolithic optical body of FIG. 2 coupled with a half ball lens instead of a full ball lens.

Still another example configuration of phase shifter and amplitude control elements 240a" and 240b" are now described with reference to the schematic diagrams of FIGS. 14a and 14b, respectively. More particularly, the first element 240a" is a phase modulator element coupled to a respective waveguide 37". In addition to (or instead of) a phase control element 240a", a Mach-Zehnder modulator (MZM) amplitude control element 240b" may also be included within the modulation portion. Both amplitude and phase control may be derived from controlling the relative optical path length (OPL=nL) through a waveguide 37". Where amplitude and phase control are used, the MZM amplitude control element 240b" may be coupled in series with the phase control element 240a", for example. The controller 66 may be coupled to the various phase and amplitude control elements discussed above to control phase and/or amplitude changes as well.

A related method for making the optical system 30 from the monolithic body of optical material 31 is now described. The method may include forming a plurality of optical waveguides 37 extending within the optical body 31 between respective optical devices 63 mounted on the optical body and a curved surface 62 defined in the optical body and spaced from the optical devices. As discussed above, the waveguides 37 and curved surface 62 may be defined in the optical body 31 using an FLDW and/or femtosecond laser FLICE process, for example. Furthermore, the optical element or lens 65 is coupled to the curved surface 62, such as with an optical adhesive, for example.

In embodiments which utilize a spherical "ball" lens (such as the ball lens 65 of FIG. 1) of refractive index $n_B$ and radius $R_B$ integrated with glass substrates of refractive index $n_G$, the focal length of the lens which defines the radius of an imaginary surface along which each terminates and is given by the following equation:

$$R_f = R_B * n_B / [n_B * (n_G + 1) - 2 * n_G]$$

In the example of FIGS. 1-2, this imaginary curved surface coincides with the curved surface 62 of the optical body 31 (i.e., where it meets the spherical ball lens 65). Yet, in another example embodiment shown in FIG. 12, the imaginary surface 70' may be farther up in the optical body (i.e., the waveguides 37' terminate before reaching the lens 65'), depending upon the above noted equation and the materials/dimensions used.

Figure 13:
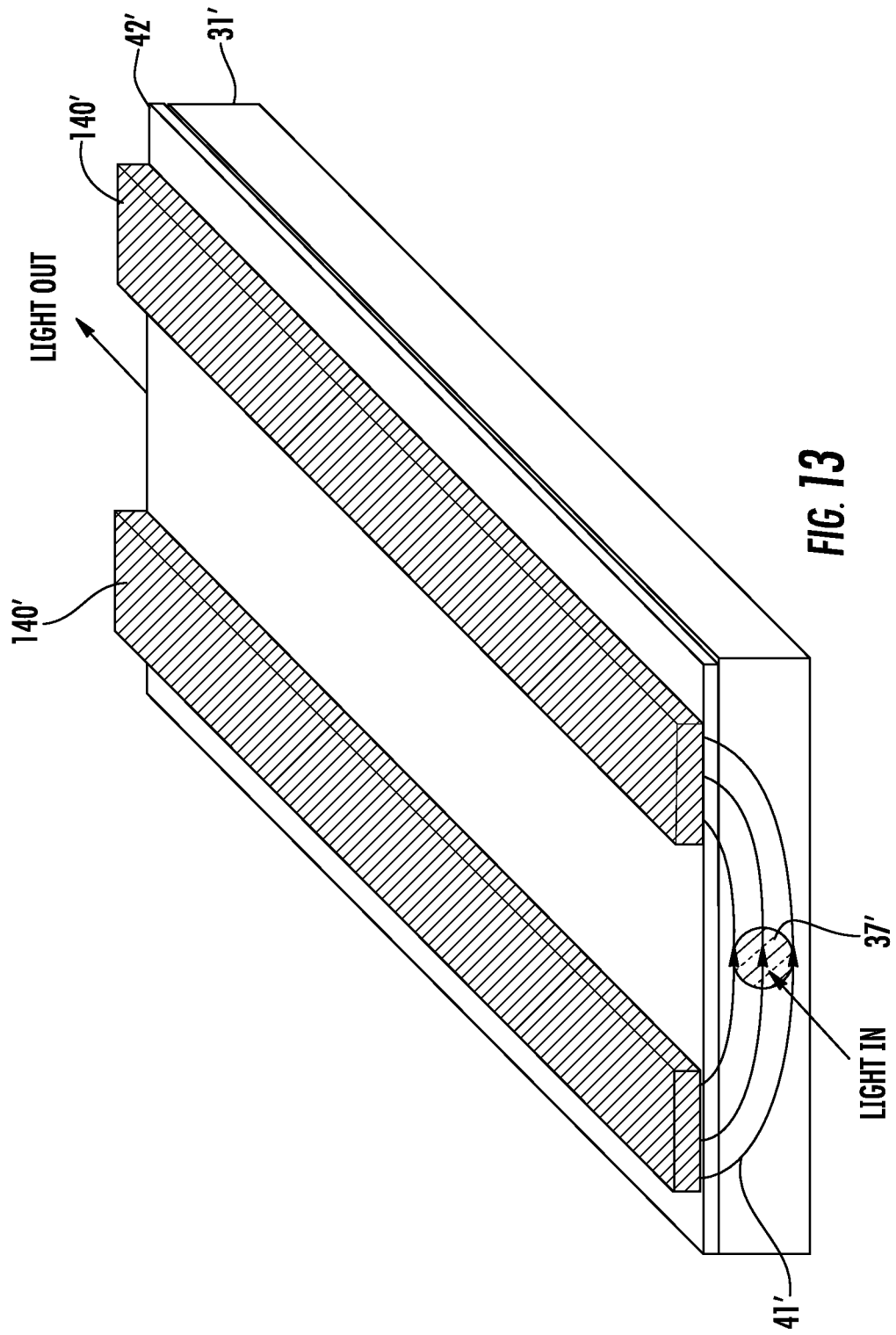

Moreover, another example configuration is shown in FIG. 13, which utilizes a spherical "half ball" lens 65" of refractive index $n_B$ and radius $R_B$ integrated with glass substrates 31" of refractive index $n_G$. Here, the focal length of the half ball lens 65" which defines the radius of the imaginary surface 70" along which the end of each waveguide 37" is arranged is given by the following equation:

$$R_f = R_B * n_G / (n_B - 1)$$

With either a ball or half ball lens approach, the optical element may optionally be "carved" directly out of the fused silica monolith using the FLICE process or other laser machining process, followed by a subsequent glass polishing step, for example.

The above-described optical systems advantageously provide for steering of an optical beam(s) by switching over a dense waveguide array arranged in the curved focal plane of a lens. As noted above, this approach may advantageously utilize the 3D waveguide writing ability of FLDW technology (or other suitable processes) to arrange waveguide facets along a spherical focal plane. This in turn allows for electronic beam steering, which may be relatively high speed and allows for selective switching of multiple beams in parallel. Furthermore, the example configuration is relatively small and lightweight compared with typical micromechanical approaches, and advantageously allows for much wider fields of view than typical mechanical and electrical beam steering approaches. Indeed, as noted above, the field of view may approach hemispherical coverage (depending on the number of optical device 63/waveguide 37 pairs used) as a result of the spherical waveguide arrangement. Moreover, the systems also advantageously allow for a potentially large transmit/receive aperture. Also, a relatively exact focal position of waveguide outputs may be optimized for enhanced sensitivity at a certain range.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that other modifications and embodiments are intended to be included within the scope of the appended claims.

That which is claimed is:

1. An optical system comprising:
   an optical body;
   a plurality of optical devices carried by the optical body;
   a plurality of optical waveguides extending within the optical body between respective optical devices and an imaginary three-dimensional (3D) curved surface within the optical body;
   an optical element coupled to the optical body and optically aligned with the plurality of optical waveguides; and
   a controller configured to selectively operate the plurality of optical devices to generate at least one optical beam.

2. The optical system of claim 1 wherein the imaginary 3D curved surface is concave.

3. The optical system of claim 1 wherein the optical element comprises at least a portion of a spherical lens.

4. The optical system of claim 1 comprising a phase modulator carried by the optical body and associated with the plurality of optical waveguides.

5. The optical system of claim 4 wherein the phase modulator comprises at least one phase shifter associated with a respective optical waveguide.

6. The optical system of claim 4 comprising a controller coupled to the phase modulator.

7. The optical system of claim 1 further comprising at least one amplitude control element associated with a respective optical waveguide.

8. The optical system of claim 1 wherein the plurality of optical devices comprises a plurality of vertical-cavity, surface-emitting lasers.

9. The optical system of claim 1 wherein the plurality of optical devices comprises a plurality of photodiodes.

10. The optical system of claim 1 wherein the optical body comprises a monolithic silica body.

11. An optical system comprising:
    an optical body;
    a plurality of optical devices carried by the optical body;
    a plurality of optical waveguides extending within the optical body between respective optical devices and an imaginary three-dimensional (3D) concave surface within the optical body;
    a lens coupled to the optical body and optically aligned with the plurality of optical waveguides; and
    a controller configured to selectively operate the plurality of optical devices to generate at least one optical beam.

12. The optical system of claim 11 wherein the lens comprises at least a portion of a spherical lens.

13. The optical system of claim 11 comprising a phase modulator carried by the optical body and associated with the plurality of optical waveguides.

14. The optical system of claim 13 wherein the phase modulator comprises at least one phase shifter associated with a respective optical waveguide.

15. The optical system of claim 13 comprising a controller coupled to the phase modulator.

16. The optical system of claim 11 further comprising at least one amplitude control element associated with a respective optical waveguide.

17. The optical system of claim 11 wherein the plurality of optical devices comprises a plurality of vertical-cavity, surface-emitting lasers.

18. The optical system of claim 11 wherein the plurality of optical devices comprises a plurality of photodiodes.

19. The optical system of claim 11 wherein the optical body comprises a monolithic silica body.

20. A method for making an optical system comprising:
    forming a plurality of optical waveguides extending within an optical body between respective optical devices mounted on the optical body and an imaginary three-dimensional (3D) curved surface in the optical body;
    coupling an optical element to the optical body and optically aligned with the plurality of optical waveguides; and
    connecting a controller to the plurality of optical devices to selectively operate the plurality of optical devices to generate at least one optical beam.

21. The method of claim 20 wherein forming the plurality of optical waveguides comprises performing femtosecond laser direct writing.

22. The method of claim 20 wherein the imaginary 3D curved surface is concave.

23. The method of claim 20 wherein the optical element comprises at least a portion of a spherical lens.

24. The method of claim 20 comprising forming a phase modulator carried by the optical body and associated with the plurality of optical waveguides.

25. The method of claim 24 wherein the phase modulator comprises at least one phase shifter associated with a respective optical waveguide.

26. The method of claim 24 wherein the phase modulator comprises at least one amplitude control element associated with a respective optical waveguide.

27. The method of claim 20 wherein the plurality of optical devices comprises a plurality of vertical-cavity, surface-emitting lasers.

28. The method of claim 20 wherein the plurality of optical devices comprises a plurality of photodiodes.

* * * * *